(12) United States Patent
Grover

(10) Patent No.: US 11,922,458 B2
(45) Date of Patent: Mar. 5, 2024

(54) CONTENT MODIFICATION SYSTEM WITH VIEWER BEHAVIOR-BASED CONTENT DELIVERY SELECTION FEATURE

(71) Applicant: ROKU, INC., San Jose, CA (US)

(72) Inventor: Matthew George Grover, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/932,323

(22) Filed: Sep. 15, 2022

(65) Prior Publication Data
US 2023/0010310 A1 Jan. 12, 2023

Related U.S. Application Data

(63) Continuation of application No. 17/229,117, filed on Apr. 13, 2021, now Pat. No. 11,494,803.

(60) Provisional application No. 63/148,568, filed on Feb. 11, 2021.

(51) Int. Cl.
*G06Q 30/00* (2023.01)
*G06Q 30/0241* (2023.01)
*G06Q 30/0242* (2023.01)
*G06Q 30/0272* (2023.01)
*G06Q 30/0273* (2023.01)
*H04N 21/81* (2011.01)

(52) U.S. Cl.
CPC ..... *G06Q 30/0247* (2013.01); *G06Q 30/0246* (2013.01); *G06Q 30/0272* (2013.01); *G06Q 30/0273* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,148,304 A * | 11/2000 | de Vries | G06F 9/451 |
| 8,762,364 B2 * | 6/2014 | Parekh | G06F 16/9535 |
| | | | 707/707 |
| 9,146,990 B2 | 9/2015 | Scherf et al. | |
| 9,202,232 B2 * | 12/2015 | Ahrens | G06Q 30/0264 |
| 9,495,451 B2 | 11/2016 | Harron | |
| 9,674,567 B1 | 6/2017 | Carter | |
| 9,912,768 B1 * | 3/2018 | Choi | H04L 67/025 |
| 9,992,533 B2 | 6/2018 | Lee et al. | |
| 10,282,753 B2 | 5/2019 | Cheung | |
| 10,402,853 B1 * | 9/2019 | Tsemekhman | G06Q 30/0246 |
| 10,417,658 B1 * | 9/2019 | Tsemekhman | G06Q 30/0242 |

(Continued)

OTHER PUBLICATIONS

Written Opinion of the International Searching Authority, Application No. PCT/US2022/015832, dated Jun. 7, 2022, 4 pages.

*Primary Examiner* — Luis A Brown
(74) *Attorney, Agent, or Firm* — Sterne, Kessler, Goldstein & Fox P.L.L.C.

(57) ABSTRACT

A method includes determining, by a computing system, a probability of whether at least a threshold portion of a particular advertisement will be presented on a particular content presentation device, and a cost associated with presentation of the particular advertisement on the particular content presentation device. The computing system calculates an expected revenue associated with presentation of the particular advertisement based on the probability and the cost. When the expected revenue exceeds a threshold revenue, the computing system communicates the particular advertisement to the particular content presentation device.

20 Claims, 14 Drawing Sheets

Replacement Advertisement Records
600

| Replacement Advertisement ID | User Profile Information (UPI) : Presentation Time (PT) | Pay point | Sequence indicator |
|---|---|---|---|
| $RID_1$ | $\{UPI_1:PT_1, UPI_2:PT_2, \ldots, UPI_M:PT_M\}$ | 15% | 1 |
| $RID_2$ | $\{UPI_1:PT_1, UPI_2:PT_2, \ldots, UPI_M:PT_M\}$ | 10 seconds | 2 |
| ... | ... | ... | ... |
| $RID_N$ | $\{UPI_1:PT_1, UPI_2:PT_2, \ldots, UPI_M:PT_M\}$ | 20% | 1 |

(56) References Cited

U.S. PATENT DOCUMENTS

| | | | |
|---|---|---|---|
| 10,506,275 B1 | 12/2019 | Thielen et al. | |
| 10,552,759 B2 | 2/2020 | Rich | |
| 10,713,094 B1* | 7/2020 | Feldman | G06F 9/5033 |
| 10,740,790 B2* | 8/2020 | Shay | G06Q 30/0254 |
| 10,755,311 B1* | 8/2020 | Davis | H04L 67/10 |
| 10,769,223 B1 | 9/2020 | Patel et al. | |
| 10,909,569 B1 | 2/2021 | Shah et al. | |
| 11,494,803 B2 | 11/2022 | Grover | |
| 2002/0083439 A1* | 6/2002 | Eldering | H04N 7/165 348/E7.063 |
| 2005/0049915 A1* | 3/2005 | Mehta | G06Q 30/0264 705/14.61 |
| 2007/0067424 A1* | 3/2007 | Raciborski | H04L 67/1023 709/223 |
| 2007/0078849 A1 | 4/2007 | Slothouber | |
| 2007/0130012 A1* | 6/2007 | Yruski | G06Q 30/0267 705/14.68 |
| 2007/0239534 A1* | 10/2007 | Liu | G06Q 30/0269 705/14.66 |
| 2008/0010155 A1* | 1/2008 | Shkedi | G06Q 30/0269 705/14.73 |
| 2008/0091524 A1* | 4/2008 | Yan | G06Q 30/0277 705/14.46 |
| 2008/0250453 A1 | 10/2008 | Smith et al. | |
| 2009/0260030 A1* | 10/2009 | Karlsson | H04N 21/64315 725/32 |
| 2009/0271228 A1* | 10/2009 | Bilenko | G06Q 30/02 705/7.29 |
| 2010/0153988 A1* | 6/2010 | Takai | H04N 21/812 725/32 |
| 2010/0306039 A1* | 12/2010 | Green | G06Q 30/0277 705/14.4 |
| 2011/0119136 A1* | 5/2011 | Eldreth | G06Q 30/0273 705/14.69 |
| 2011/0167486 A1* | 7/2011 | Ayloo | G06Q 30/0277 705/14.66 |
| 2014/0129325 A1* | 5/2014 | Zinger | G06Q 30/0241 705/14.46 |
| 2014/0278914 A1* | 9/2014 | Gurumoorthy | G06Q 30/0243 705/14.42 |
| 2015/0012367 A1* | 1/2015 | Simo | G06Q 30/0275 705/14.71 |
| 2016/0358229 A1* | 12/2016 | Bhalgat | G06Q 50/01 |
| 2016/0366492 A1 | 12/2016 | Muller et al. | |
| 2017/0026678 A1* | 1/2017 | Smith | H04N 21/482 |
| 2017/0034108 A1 | 2/2017 | Fechete et al. | |
| 2017/0161772 A1* | 6/2017 | Xu | G06F 16/2455 |
| 2017/0193555 A1* | 7/2017 | Davis | H04L 67/535 |
| 2017/0286853 A1 | 10/2017 | Liensberger et al. | |
| 2018/0218389 A1* | 8/2018 | Walker | G06Q 30/0242 |
| 2018/0288494 A1* | 10/2018 | Grover | H04N 21/23418 |
| 2020/0012765 A1* | 1/2020 | Smaiely | H04L 9/50 |
| 2020/0028925 A1 | 1/2020 | Monge Nunez et al. | |
| 2020/0029108 A1 | 1/2020 | Dunker et al. | |
| 2020/0034874 A1* | 1/2020 | Narayan | G06Q 30/0277 |
| 2020/0228854 A1 | 7/2020 | O'Connell et al. | |
| 2020/0389684 A1* | 12/2020 | Grover | H04N 21/812 |
| 2020/0396521 A1* | 12/2020 | Weiner | H04N 21/812 |
| 2020/0401949 A1* | 12/2020 | Dangi | G06N 20/00 |
| 2020/0404348 A1 | 12/2020 | Merchant et al. | |
| 2021/0035163 A1* | 2/2021 | Peris | G06Q 30/0243 |
| 2021/0110430 A1* | 4/2021 | Sullivan | G06Q 30/0244 |
| 2022/0020052 A1 | 1/2022 | Grover | |
| 2022/0318845 A1 | 10/2022 | Grover | |

* cited by examiner

| Time Period | Content Distribution System 102 | Content-Presentation Device 104 | Fingerprint-Matching Server 106 | Content Management System 108 | Data-Management System 119 | Supplemental Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| Time Period | Content Distribution System 102 | Content-Presentation Device 104 | Fingerprint-Matching Server 106 | Content Management System 108 | Data-Management System 119 | Supplemental Content Delivery System 112 |
|---|---|---|---|---|---|---|
| T9 | | | Compare first fingerprint data and second fingerprint data | | | |
| T10 | | | Detect a match between first fingerprint data and second fingerprint data | | | |
| T11 | | | Identify the channel on which the second content is being received | | | |
| T12 | | | Generate metadata associated with the identified channel | | | |
| T13 | | | Transmit an indication of the identified channel and the associated metadata | | | |
| T14 | | | | | Receive the indication of the identified channel and the associated metadata | |

Figure 4B

| | | | | | | | | | |
|---|---|---|---|---|---|---|---|---|---|
| T15 | | Determine historical content consumption data | | | | | | | |
| T16 | Transmit third content | | | | | | | | |
| T17 | | Generate third fingerprint data and third metadata | | | | | | | |
| T18 | | Transmit third fingerprint data and third metadata | | | | | | | |
| T19 | | | | | | Receive modifiable content segment | | | |
| T20 | | | | | | | Generate fourth fingerprint data and fourth metadata | | |
| T21 | | | | | | | Transmit fourth fingerprint data and fourth metadata | | |
| T22 | | | | | | | | Receive third fingerprint data and third metadata | |
| T23 | | | | | | | | Receive fourth fingerprint data and fourth metadata | |

Figure 4C

| | | | | | | | |
|---|---|---|---|---|---|---|---|
| T24 | | | Compare at least a portion of third fingerprint data and at least a portion of fourth fingerprint data | | | | |
| T25 | | | Detect a match between at least a portion of third fingerprint data and at least a portion of fourth fingerprint data | | | | |
| T26 | | | Identify an upcoming content modification opportunity on the identified channel | | | | |
| T27 | | | Transmit the third fingerprint data and the third metadata | | | | |
| T28 | | Receive third fingerprint data and third metadata | | | | | |
| T29 | | Receive fifth content | | | | | |
| T30 | | Output for presentation fifth content | | | | | |

Figure 4D

|  | | | | | | | | |
|---|---|---|---|---|---|---|---|---|
| T31 | Generate fifth fingerprint data and fifth metadata | | | | | | | |
| T32 | Compare third fingerprint data and fifth fingerprint data | | | | | | | |
| T33 | Detect a match between third fingerprint data and fifth fingerprint data | | | | | | | |
| T34 | Determine modification start time and modification end time | | | | | | | |
| T35 | Transmit a request for supplemental content | | | | | | | |
| T36 | | | | | Receive request and select supplemental content | | | |
| T37 | | | | | | Transmit request for link | | |
| T38 | | | | | | | | Transmit link |

Figure 4E

|  |  |  |
|---|---|---|
|  |  |  |
|  |  |  |
| Transmit link |  |  |
|  |  |  |
|  | Receive link and retrieve supplemental content | Perform content modification operation |
|  |  |  |
| T39 | T40 | T41 |

Figure 4F

Replacement Advertisement Records
600

| Replacement Advertisement ID | User Profile Information (UPI) : Presentation Time (PT) | Pay point | Sequence indicator |
|---|---|---|---|
| $RID_1$ | $\{UPI_1:PT_1, UPI_2:PT_2, \ldots, UPI_M:PT_M\}$ | 15% | 1 |
| $RID_2$ | $\{UPI_1:PT_1, UPI_2:PT_2, \ldots, UPI_M:PT_M\}$ | 10 seconds | 2 |
| ... | ... | ... | ... |
| $RID_N$ | $\{UPI_1:PT_1, UPI_2:PT_2, \ldots, UPI_M:PT_M\}$ | 20% | 1 |

Figure 6

CONTENT MODIFICATION SYSTEM WITH VIEWER BEHAVIOR-BASED CONTENT DELIVERY SELECTION FEATURE

RELATED APPLICATIONS

This application claims the benefit of priority under 35 U.S.C. § 119(e) of U.S. Provisional Application No. 63/148,568, filed Feb. 11, 2021, and U.S. application Ser. No. 17/229,117, filed Apr. 13, 2021, the content of which is incorporated herein by reference in their entities.

BACKGROUND

Field

This application generally relates to content modification systems. In particular, this application describes a content modification system with a viewer behavior-based content delivery selection feature.

Description of Related Art

Dynamic advertisement insertion (DAI) involves dynamically selecting and communicating an advertisement or other content to a user via a communication channel (e.g., television). In some cases, the DAI system selects the advertisement based on the content being watched by the user and/or the viewing habits of the user.

Selection and communication of the advertisement consume DAI system resources in terms of hardware and, therefore, the DAI system operator incurs a cost for the delivery of the advertisement. The DAI system operator may pass these costs along to the advertiser associated with the advertisement. In some cases, however, costs are not assessed to the advertiser until or unless a threshold amount of a particular advertisement is presented. For example, costs may not be assessed if the user changes channels a few seconds after the start of the presentation of the advertisement. DAI system resources may nevertheless be consumed, and, therefore, the cost for the partial delivery of the advertisement may be incurred by the DAI system operator.

SUMMARY

In one aspect, a method includes determining, by a computing system, a probability of whether at least a threshold portion of a particular advertisement will be presented on a particular content presentation device, and a cost associated with presentation of the particular advertisement on the particular content presentation device. The computing system calculates an expected revenue associated with presentation of the particular advertisement based on the probability and the cost. When the expected revenue exceeds a threshold revenue, the computing system communicates the particular advertisement to the particular content presentation device.

In another aspect, a non-transitory computer-readable storage medium has stored thereon program instructions that, upon execution by a processor, cause performance of a set of operations. The set of operations includes determining, by the processor, a probability of whether at least a threshold portion of a particular advertisement will be presented on a particular content presentation device, and a cost associated with presentation of the particular advertisement on the particular content presentation device. The processor calculates an expected revenue associated with presentation of the particular advertisement based on the probability and the cost. When the expected revenue exceeds a threshold revenue, the processor communicates the particular advertisement to the particular content presentation device.

In another aspect, a computing system includes a processor and a non-transitory computer-readable storage medium, having stored thereon program instructions that, upon execution by the processor, cause performance of a set of operations. The set of operations includes determining, by the processor, a probability of whether at least a threshold portion of a particular advertisement will be presented on a particular content presentation device, and a cost associated with presentation of the particular advertisement on the particular content presentation device. The processor calculates an expected revenue associated with presentation of the particular advertisement based on the probability and the cost. When the expected revenue exceeds a threshold revenue, the processor communicates the particular advertisement to the particular content presentation device.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

FIG. 6 illustrates replacement advertisement records, in accordance with an example.

DETAILED DESCRIPTION

Figure 1:
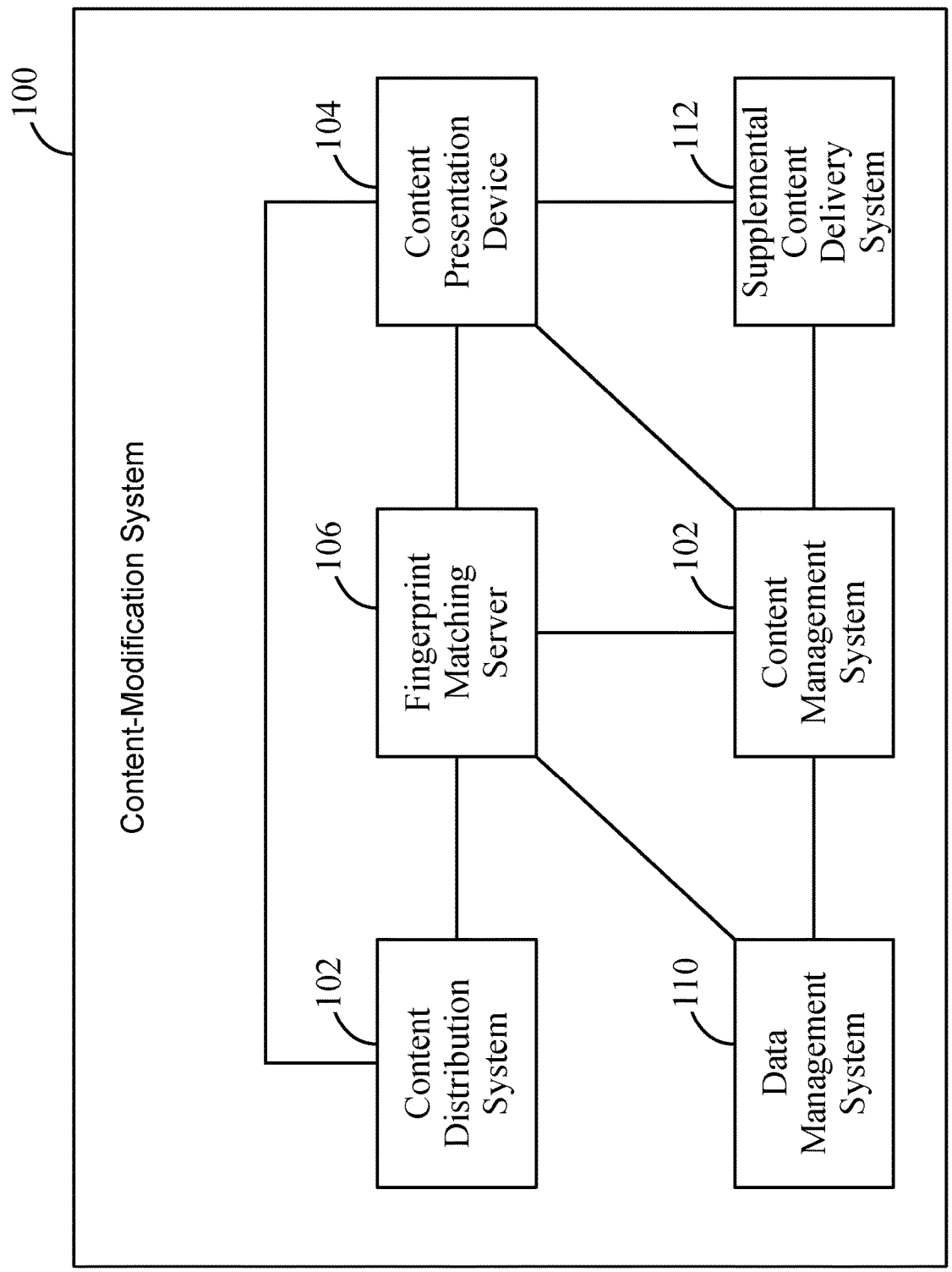
FIG. 1 is a simplified block diagram of an example content-modification system in which various described principles can be implemented.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide. Further, unless otherwise specified and/or unless the particular context clearly dictates otherwise, the terms such as "a" or "an" mean at least one, and the term "the" means the at least one.

I. Overview

To deliver and present content to end-users, a content provider can transmit the content to one or more content-distribution systems, each of which can, in turn, transmit the content to one or more respective content presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content presentation devices can take various forms. For instance, a content-distribution system can be associated with a cable-television provider and can transmit video content to content presentation devices of end-users who are cable-television subscribers through hybrid fiber/coaxial cable connections.

As such, in various scenarios, a content-distribution system can transmit content to a content presentation device, which can receive and output the content for presentation to an end-user. In some situations, even though the content presentation device receives content from the content-distribution system, it can be desirable for the content presentation device to perform a content-modification operation so that the content presentation device can output for presentation alternative content instead of at least a portion of that received content.

For example, in the case where the content presentation device receives a linear sequence of content segments that includes a given advertisement segment positioned somewhere within the sequence, it can be desirable for the content presentation device to replace the given advertisement segment with a different advertisement segment that is perhaps more targeted to the end-user (e.g., more targeted to the end-user's interests, demographics, etc.). As another example, it can be desirable for the content presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content presentation device data to facilitate preparing the content presentation device to perform a content-modification operation in connection with the identified upcoming content-modification opportunity.

However, in other cases, it may be desirable for the content presentation device to use one or more alternative techniques to facilitate performing a content-modification operation.

For example, the fingerprint-matching server can use broadcast-schedule data to facilitate the content presentation device performing a content-modification operation. Among other things, this can allow the content presentation device to facilitate performing a content-modification operation without using fingerprint data or by using fingerprint data in a more limited fashion. This can be beneficial in the case where the content presentation device does not receive or otherwise have access to fingerprint data, or where the use of fingerprint data is undesirable for one or more reasons (e.g., because fingerprint-based techniques may be computationally expensive).

II. Architecture

A. Content-Modification System

FIG. 1 is a simplified block diagram of an example content-modification system 100. The content-modification system 100 can include various components, such as a content-distribution system 102, a content presentation device 104, a fingerprint-matching server 106, a content management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content presentation devices.

B. Computing System

Figure 2:
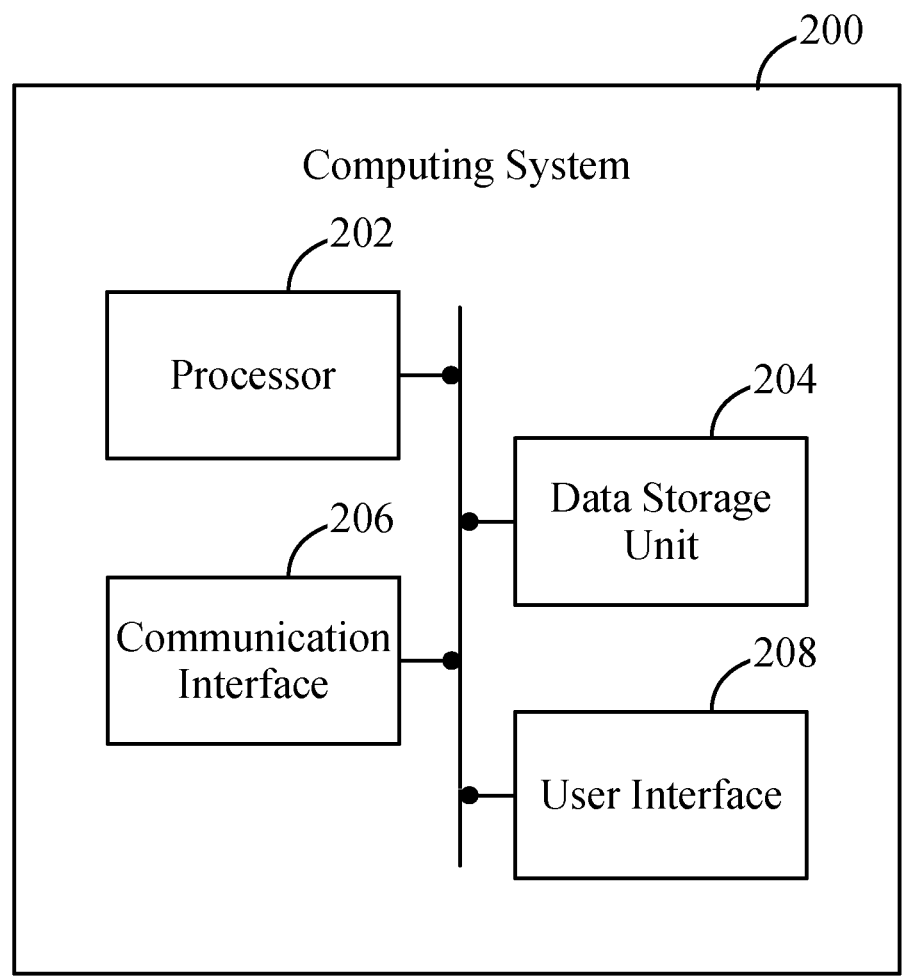
FIG. 2 is a simplified block diagram of an example computing system in which various described principles can be implemented.

FIG. 2 is a simplified block diagram of an example computing system 200. An example of the computing system 200 is configured to perform one or more operations, such as the operations described in this disclosure. An example of the computing system 200 includes various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content presentation device 104 receiving and outputting content will now be described.

To begin, the content-distribution system 102 can transmit content (e.g., that it received from a content provider) to one or more entities such as the content presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content presentation device 104 can take various forms. By way of example, the content-distribution system 102 can be or include a cable-television head-end that is associated with a cable-television provider and that transmits the content on the channel to the content presentation device 104 through hybrid fiber/coaxial cable connections. As another example, the content-distribution system 102 can be or include a satellite-television head-end that is associated with a satellite-television provider and that transmits the content on the channel to the content presentation device 104 through a satellite transmission. As yet another example, the content-distribution system 102 can be or include a television-broadcast station that is associated with a television-broadcast provider and that transmits the content on the channel through a terrestrial over-the-air interface to the content presentation device 104. In these and other examples, the content-distribution system 102 can transmit the content in the form of an analog or digital broadcast stream representing the content.

The content presentation device 104 can receive content from one or more entities, such as the content-distribution system 102. In one example, the content presentation device 104 can select (e.g., by tuning to) a channel from among multiple available channels, perhaps based on input received via a user interface, such that the content presentation device 104 can receive content on the selected channel.

In some examples, the content-distribution system 102 can transmit content to the content presentation device 104, which the content presentation device 104 can receive, and therefore the transmitted content and the received content can be the same. However, in other examples, they can be different, such as where the content-distribution system 102 transmits content to the content presentation device 104, but the content presentation device 104 does not receive the content and instead receives different content from a different content-distribution system.

The content presentation device 104 can also output content for presentation. As noted above, the content presentation device 104 can take various forms. In one example, in the case where the content presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content presentation device 104, which can receive and output the content for presentation to an end-user. In some situations, even though the content presentation device 104 receives content from the content-distribution system 102, it can be desirable for the content presentation device 104 to perform a content-modification operation so that the content presentation device 104 can output for presentation alternative content instead of at least a portion of that received content.

For example, in the case where the content presentation device 104 receives a linear sequence of content segments that includes a given advertisement segment positioned somewhere within the sequence, it can be desirable for the content presentation device 104 to replace the given advertisement segment with a different advertisement segment that is perhaps more targeted to the end-user (i.e., more targeted to the end-user's interests, demographics, etc.). As another example, it can be desirable for the content presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content presentation device 104 can receive a linear sequence of content segments. This is referred to herein as a "receipt sequence." In line with the discussion above, the transmission sequence and the receipt sequence can be the same or they can be different.

Figure 3:
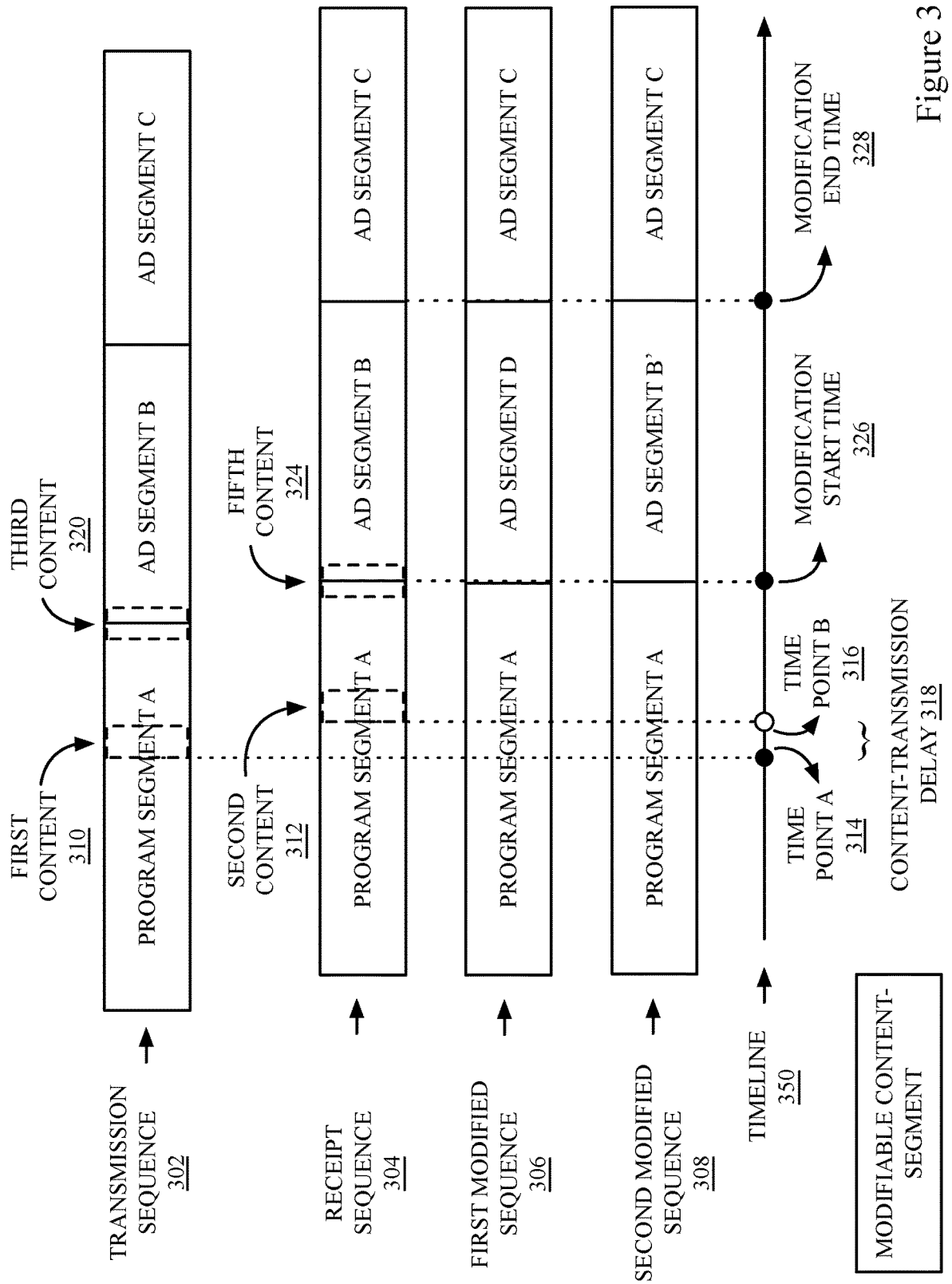
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content presentation device 104, which the content presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content presentation device 104 receives content from the content-distribution system 102, it can be desirable for the content presentation device 104 to perform a content-modification operation so that the content presentation device 104 can output for presentation alternative content instead of at least a portion of that received content. For example, in the case where the content presentation device 104 receives the receipt sequence, rather than outputting for presentation the receipt sequence, the content presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content presentation device 104 to replace the given advertisement segment with a different advertisement segment that is perhaps more targeted to the end-user (i.e., more targeted to the end-user's interests, demographics, etc.), thereby resulting in a modified sequence that the content presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content presentation device 104 to overlay on the given advertisement segment, overlay content that enhances the given advertisement segment in a way that is again perhaps more targeted to the end-user, thereby resulting in a modified sequence that the content presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content Presentation Device Receiving Second Content During a time-period T4, the content presentation device 104 can receive content from the content-distribution system 102. This content is referred to herein as "second content." In one example, the second content is the SECOND CONTENT 312 shown in FIG. 3.

During a time-period T5, the content presentation device 104 can generate fingerprint data representing the second content. This fingerprint data is referred to herein as "second fingerprint data." The content presentation device 104 can generate the second fingerprint data using any content fingerprinting process now known or later developed. The content presentation device 104 can generate the second fingerprint data at various rates, such as at the rate of one fingerprint per frame of the second content. The second fingerprint data can be or include some or all of these generated fingerprints.

The content presentation device 104 can access the second content at various points within the content presentation device 104. As one example, the content presentation device 104 can access the second content as it is being received by an input buffer (e.g., an HDMI buffer) of the content presentation device 104. In another configuration, the content presentation device 104 can access the second content as it is being received by a display buffer of the content presentation device 104. In this configuration, the second content can therefore be content that the content presentation device 104 not only receives, but also outputs for presentation.

Also during the time-period T5, the content presentation device 104 can generate metadata associated with the second content and/or the second fingerprint data. This metadata is referred to herein as "second metadata." As one example, the second metadata can be or include a receipt time-stamp, which represents a time-point at which the content presentation device 104 received the second content. The content presentation device 104 can determine the receipt time-stamp in various ways, such as based on a time clock that is synchronized to a reference clock. As noted above, the content presentation device 104 can access the second content at various points within the content presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content presentation device 104 can associate the second fingerprint data with the second metadata in various ways. For instance, where the second fingerprint data includes multiple fingerprints with each fingerprint representing a corresponding frame of second content, the content presentation device 104 can associate each second fingerprint with a corresponding receipt time-stamp and/or other corresponding metadata.

During a time-period T6, the content presentation device 104 can transmit the second fingerprint data and the second metadata to the fingerprint-matching server 106. The content presentation device 104 can transmit the second fingerprint data and the second metadata at a given interval. For example, every two seconds, the content presentation device 104 can transmit the second fingerprint data and the second metadata that it generated during that most recent two-second time-period.

D. Operations Related to Identifying a Channel on Which the Content Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content presentation device 104. As noted above, the second fingerprint data represents the second content received by the content presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content presentation device 104. In one example, the fingerprint-matching server 106 can identify the channel based on the channel identifier metadata associated with the first fingerprint data used to detect the match.

Notably, in practice, since there are likely to be multiple potential channels on which the content presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content presentation device 104 that is receiving content on the identified channel. The fingerprint-matching server 106 can determine the device identifier in various ways, such as by receiving it from the content presentation device 104. In another example, the fingerprint-matching server 106 can receive data (e.g., device registration data) from the content presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content presentation device 104 has received content on the identified channel, what specific content the content presentation device 104 has received, etc. This type of data is referred to herein as "historical content consumption data."

As such, during a time-period T15, the data-management system 110 can determine historical content consumption data associated with the content presentation device 104.

F. Operations Related to the Content-Distribution System Transmitting Third Content As noted above, the fingerprint-matching server 106 can identify the channel on which the content presentation device 104 is receiving the second content.

During a time-period T16, the content-distribution system 102 can transmit content on the identified channel to the content presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content Management System Receiving a Modifiable Content-Segment During a time-period T19, the content management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content management system 108, such that the content management system 108 can receive it in this way.

During a time-period T20, the content management system 108 can generate fingerprint data representing the modifiable content-segment. This fingerprint data is referred to herein as "fourth fingerprint data." The content management system 108 can generate the fourth fingerprint data using any fingerprint generation technique now known or later developed. The content management system 108 can generate the fourth fingerprint data at a given rate, such as at the rate of one fingerprint per frame of the fourth content. The fourth fingerprint data can be or include some or all of these generated fingerprints.

Also during the time-period T20, the content management system 108 can generate metadata associated with the modifiable content-segment and/or the fourth fingerprint data. This metadata is referred to herein as "fourth metadata." As one example, the fourth metadata can be or include a duration of the modifiable content-segment. The content management system 108 can determine the duration in various ways, such as based on the fingerprint generation process. For example, in the case where the content management system 108 generating the fourth fingerprint data involves generating one fingerprint per frame, where the modifiable content-segment has a frame rate of 30 frames per second, and where the fingerprinting process results in 300 fingerprints being generated, the content management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content management system 108 can transmit the fourth fingerprint data and the fourth metadata to the fingerprint-matching server 106.

In practice, the content management system 108 is likely to receive many modifiable content-segments. In such situations, the content management system 108 can perform one or more of the operations described above, as appropriate for each of the many received modifiable content-segments. As such, the content management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content presentation device 104 data to facilitate preparing the content presentation device 104 to perform a content-modification operation in connection with the identified upcoming content-modification opportunity.

During a time-period T28, the content presentation device 104 can receive the third fingerprint data and the third metadata from the fingerprint-matching server 106.

During a time-period T29, the content presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content presentation device 104 can receive the third fingerprint data and the third metadata from the fingerprint-matching server 106 before receiving the fifth content from the content-distribution system 102. In this way, the content presentation device 104 can receive fingerprint data representing content that the content presentation device 104 is expecting to receive shortly thereafter, and that the content presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content presentation device 104 is likely to receive the fifth content shortly after (e.g., immediately after or a few seconds or minutes after) receiving the second content.

During a time-period T30, the content presentation device 104 can output for presentation at least a portion of the fifth content. For example, referring to FIG. 3, the content presentation device can output for presentation the portion of the FIFTH CONTENT 324 that is the end portion of the PROGRAM SEGMENT A.

As noted above, in some situations, even though the content presentation device 104 receives content from the content-distribution system 102, it can be desirable for the content presentation device 104 to perform a content-modification operation so that the content presentation device 104 can output for presentation alternative content instead of at least a portion of the received content.

As such, even though the content presentation device 104 receives the fifth content and outputs for presentation at least a portion of the fifth content, it can be desirable for the content presentation device 104 to perform a content-modification operation so that the content presentation device 104 can also output for presentation alternative content instead of at least another portion (e.g., the remaining portion) of the fifth content. For example, referring to FIG. 3, it can be desirable for the content presentation device 104 to replace at least a portion of the AD SEGMENT B with at least a portion of a different advertisement segment that is perhaps more targeted to the end-user. As another example, it can be desirable for the content presentation device 104 to overlay on at least a portion of the AD SEGMENT B, overlay content that enhances at least a portion of the AD SEGMENT B in a way that is again perhaps more targeted to the end-user.

During a time-period T31, the content presentation device 104 can generate fingerprint data representing the fifth content. This fingerprint data is referred to herein as "fifth fingerprint data." The content presentation device 104 can generate the fifth fingerprint data using any content fingerprinting process now known or later developed. The content presentation device 104 can generate the fifth fingerprint data at various rates, such as at the rate of one fingerprint per frame of the fifth content. The fifth fingerprint data can be or include some or all of these generated fingerprints.

Also during the time-period T31, the content presentation device 104 can generate metadata associated with the fifth content and/or the fifth fingerprint data. This metadata is referred to herein as "fifth metadata."

The content presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content presentation device 104 can receive the third fingerprint data from the fingerprint-matching server 106 and can generate the fifth fingerprint data.

During a time-period T32, the content presentation device 104 can compare the third fingerprint data and the fifth fingerprint data to determine whether there is a match.

During a time-period T33, based on the comparing, the content presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content presentation device 104 on the same identified channel, is referred to herein as a "hot match attempt." The content presentation device 104 can compare and/or detect a match between fingerprint data using any content fingerprint comparing and matching process now known or later developed.

During a time-period T34, based on the detected match, the content presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content presentation device 104 can then determine the modification start-time by determining a time-period between (i) a current receipt time-stamp associated with a first portion of the fifth content that the content presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content presentation device 104 performs a hot match attempt and does not detect a match, the content presentation device 104 can determine that the content presentation device 104 is no longer receiving content on the most recently identified channel. In response, the content presentation device 104 can repeat one or more of the operations described above so that the fingerprint-matching server 106 can perform another cold match attempt, to attempt to identify the channel again.

During a time-period T35, the content presentation device 104 can transmit a request for content for use in connection with performing the content-modification operation, to the content management system 108. This content is referred to herein as "supplemental content." In one example, the content presentation device 104 can transmit the request before the modification start-time (e.g., ten seconds before). In some cases, the request can include selection criteria for the supplemental content, which the content presentation device 104 can determine based on the third metadata that the content presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content management system 108 can receive the request and use it as a basis to select supplemental content from among multiple supplemental content items that are available for selection. In some cases, the content management system 108 can receive and consider various data to help inform which supplemental content to select. For example, the content management system 108 can receive historical content consumption data for the content presentation device 104 from the data-management system 110 and/or the content management system 108 can receive demographic data from a demographic data provider. The content management system 108 can then use at least the received historical content consumption data and/or the received demographic data as a basis to select the supplemental content.

The content management system 108 can cause the selected supplemental content to be transmitted to the content presentation device 104. In one example, the content management system 108 can do this by communicating with a supplemental-content delivery system 112 that can host the supplemental content. The supplemental-content delivery system 112 can take various forms and can include various components, such as a content distribution network (CDN).

During a time-period T37, the content management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content management system 108.

During a time-period T39, the content management system 108 can then in turn transmit the link to the content presentation device 104.

During a time-period T40, the content presentation device 104 can receive the link, which it can use to retrieve the supplemental content from the supplemental-content delivery system 112, such that the content presentation device 104 can use the retrieved supplemental content in connection with performing the content-modification operation. In one example, the content presentation device 104 can retrieve the supplemental content and store the supplemental content in a data-storage unit of the content presentation device 104.

As such, in some examples, the content presentation device 104 can receive the modifiable content-segment from one source (e.g., the content-distribution system 102), and the supplemental content from another source (e.g., the supplemental-content delivery system 112). These segments can be transmitted to, and received by, the content presentation device 104 in different ways. For example, the content-distribution system 102 can transmit, and the content presentation device 104 can receive, the modifiable content-segment as a broadcast stream transmission, whereas the supplemental-content delivery system 112 can transmit, and the content presentation device 104 can receive, the supplemental content as an over-the-top (OTT) transmission. In this context, in one example, the content-distribution system 102 can receive the modifiable content-segment via one communication interface (e.g., an HDMI interface), and the content presentation device 104 can receive the supplemental content via a different communication interface (e.g., an Ethernet or WI-FI interface).

J. Operations Related to the Content Presentation Device Performing a Content-Modification Operation At a time-period T41, the content presentation device 104 can perform the content-modification operation. The content presentation device 104 can do this in various ways, perhaps depending on the type of content-modification operation to be performed.

In one example, the content presentation device 104 performing a content-modification operation can involve the content presentation device 104 modifying the modifiable content-segment by replacing it with supplemental content. This is referred to herein as a "content-replacement operation." For example, in this scenario, the content presentation device 104 can receive a linear sequence of content segments that includes the modifiable content-segment and the associated metadata, and can also receive the supplemental content segment, as described above. The content presentation device 104 can output for presentation the sequence of content segments up until the modification start-time (which corresponds to the start of the modifiable content-segment), at which time the content presentation device 104 can switch to outputting for presentation the supplemental content instead. Then, at the modification end-time (which corresponds to the end of the modifiable content-segment), the content presentation device 104 can switch back to outputting for presentation the content that follows in the linear sequence of content segments (or perhaps to other content, such as additional supplemental content that is replacing another modifiable content-segment).

In one example, the operation of the content presentation device 104 switching from outputting the sequence of content segments to outputting the supplemental content can involve using various buffers of the content presentation device 104. For example, this can involve the content presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content presentation device 104 can replace the AD SEGMENT B with the AD SEGMENT D. As a result, rather than outputting for presentation the RECEIPT SEQUENCE 304, the content presentation device can instead output for presentation the FIRST MODIFIED SEQUENCE 306.

In another example, the content presentation device 104 performing a content-modification operation can involve the content presentation device 104 modifying a modifiable content-segment by overlaying on the modifiable content-segment, overlay content (referred to herein as a "content overlay operation"). For example, in this scenario, the content presentation device 104 can again receive a linear sequence of content segments that includes the modifiable content-segment and the associated metadata, and the content presentation device 104 can also receive the supplemental content, as described above.

The content presentation device 104 can then output for presentation the modifiable content-segment as it ordinarily would, except that starting at the modification start-time, the content presentation device 104 can start overlaying the supplemental content on the modifiable content-segment. The content presentation device 104 can continue overlaying the supplemental content until the modification end-time. In this way, the content presentation device 104 can overlay the supplemental content during at least some temporal portion of the modifiable content-segment.

In one example, the operation of the content presentation device 104 overlaying supplemental content on the modifiable content-segment can involve using various buffers of the content presentation device 104. For example, this can involve the content presentation device 104 using a portion of first data in a first input buffer where the sequence of content segments is being received together with second data in a second input buffer where the supplemental content is being received, for the purposes of populating a display buffer. In this way, the content presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content presentation device 104 can overlay supplemental content on the AD SEGMENT B, thereby modifying it to AD SEGMENT B'. As a result, rather than outputting for presentation the RECEIPT SEQUENCE 304, the content presentation device can instead output for presentation the SECOND MODIFIED SEQUENCE 308.

In some examples, the content presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content presentation device 104 and/or associated display device. Thus, the FIRST MODIFIED SEQUENCE 306 or the SECOND MODIFIED SEQUENCE 308 can be output on the same channel on which the content presentation device 104 is tuned—that is, the channel on which the modifiable content-segment is received and on which the content-modification opportunity was identified.

K. Tracking and Reporting Operation-Related Data

To help facilitate performance of various operations such as the content presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content presentation device 104, the content-distribution system 102 or another entity can insert a channel identifier in the form of a watermark into the second content, such that the fingerprint-matching server 106, the content presentation device 104, or another entity can extract the channel identifier and use it to identify the channel on which the second content is being received by the content presentation device 104.

In this context, the content-modification system 100 can employ any watermark technique now known or later developed.

M. Operations Related to Selecting Replacement Advertisements

Operations associated with the selection procedures for selecting particular replacement advertisement(s) (e.g., supplemental content) to be communicated to a content presentation device 104 are described in FIGS. 5-8. To reiterate, the operator of a dynamic advertisement insertion (DAI) system incurs costs when preparing DAI opportunities, for example, the cost of the webserver to serve the replacement file to a content presentation device (e.g., a TV). Some of these costs are incurred regardless of whether a replacement advertisement is presented. Therefore, if the replacement advertisement is not presented or if the replacement advertisement is not presented past the "pay point" of the replacement advertisement, the DAI system operator will incur a loss on that opportunity. As used herein, replacement advertisements correspond to the supplemental content described above.

Figure 5:
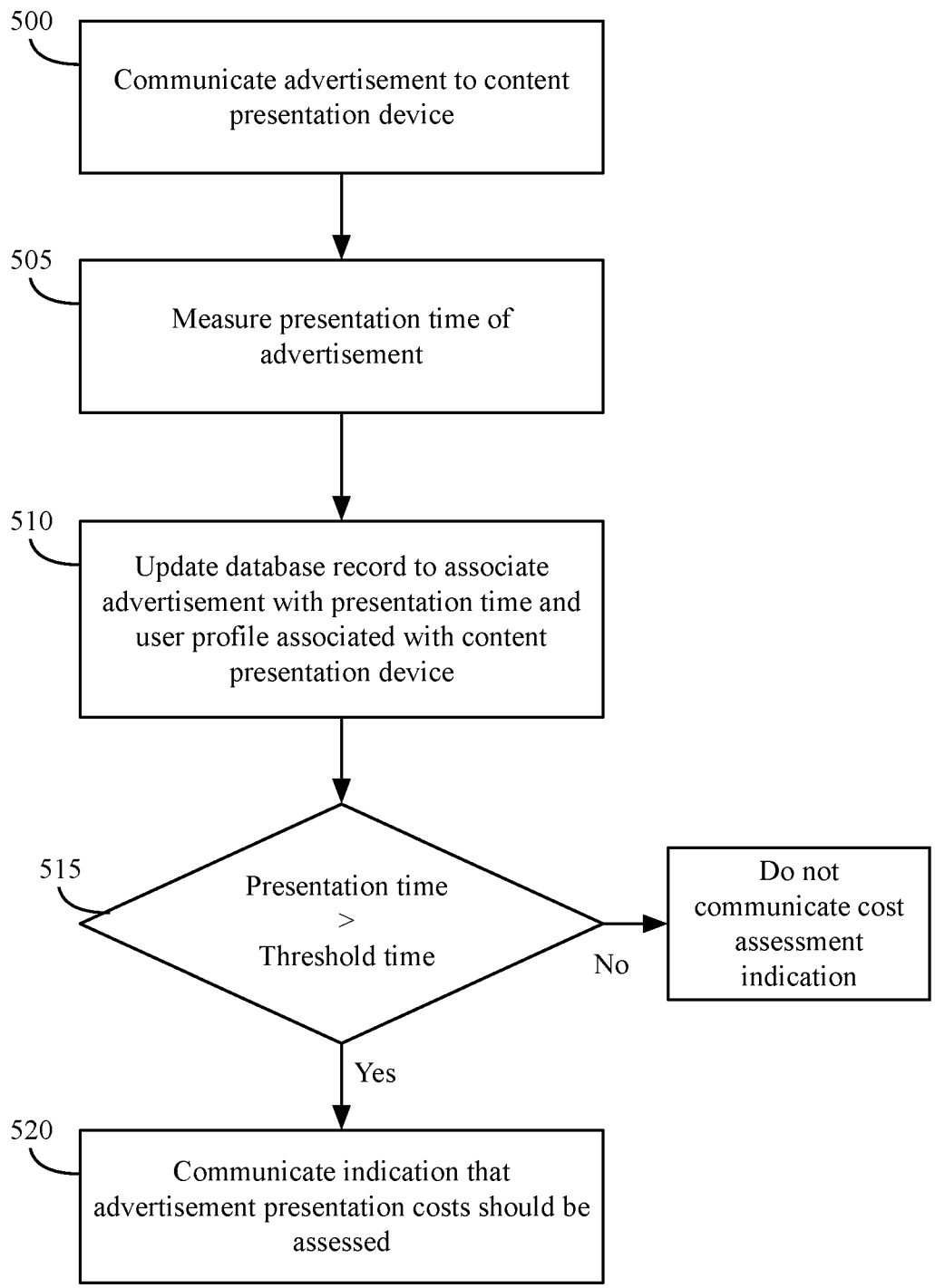
FIG. 5 illustrates operations that facilitate updating a database with information that facilitates predicting the presentation time associated with replacement advertisements, in accordance with an example.

FIG. 5 illustrates examples of operations that facilitate updating a database with information that facilitates predicting the presentation time associated with replacement advertisements. At block 500, replacement advertisement content is communicated to a content presentation device 104. For instance and as described above between time-periods T36 and T41, in an example, the content management system 108 transmits a request for a link (e.g., a Uniform Resource Identifier (URI) or a Uniform Resource Locator (URL)) pointing to hosted replacement advertisement content, to the supplemental content delivery system 112. The supplemental-content delivery system 112 then receives and responds to the request for the link by transmitting the requested link to the content management system 108. The content management system 108 transmits the link to the content presentation device 104. The content presentation device 104 receives the link and subsequently retrieves the replacement advertisement content from the supplemental-content delivery system 112 and performs the content-modification operation.

At block 505, the presentation time associated with the replacement advertisement content is measured. An example of the presentation time corresponds to the amount of time the replacement advertisement is being presented by the content presentation device 104. In an example, the content presentation device 104 implements a timer and starts the timer when the presentation of the replacement advertisement content begins. The timer stops when the presentation of the replacement advertisement ceases (e.g., when the channel is changed, the content presentation device 104 is turned off, the replacement advertisement runs its course, etc.). For example, if a channel change operation occurs 5 seconds into a 30-second advertisement, the measured presentation time corresponds to 5 seconds. In an example, the time is measured in absolute terms (e.g., 5 seconds) or in relative terms (e.g., 17% of the total length of replacement advertisement).

In another example, the presentation time is determined by the content management system 108. For instance, an example the content management system 108 determines that a channel change has occurred by detecting a change in the content associated with fingerprints received from the content presentation device 104. For example, during an initial period, fingerprints generated by the content presentation device 104 may be determined to correspond to the first channel of content, and during a subsequent period, the fingerprints generated by the content presentation device 104 may be determined to correspond to the second channel. The point at which the channel change occurs can be indicative of the time at which the presentation of the replacement advertisement ceased and, therefore, facilitate determining the presentation time associated with the replacement advertisement.

At block 510, a replacement advertisement record associated with the replacement advertisement is updated to associate the replacement advertisement with the presentation time and user profile information.

FIG. 6 illustrates an example of replacement advertisement records 600. In an example, the replacement advertisement records 600 include a replacement advertisement ID field, a user profile information/presentation time field (UPIPT field), a pay point field, and a sequence indicator field. An example of a replacement advertisement ID field specifies information (e.g., a randomly assigned value, a hash associated with the replacement advertisement, etc.) that uniquely identifies a particular replacement advertisement. An example of the UPIPT field specifies user profile information/presentation time pairs (e.g., user profile information 1:10%, user profile information 2, 80%, etc.). An example of the pay point field specifies the presentation time threshold at which point costs for presentation of the replacement advertisement are assessed (e.g., 15% of total duration, 10 seconds, etc.)

An example of the sequence indicator field specifies the location within a sequence of advertisements the corresponding replacement advertisement was presented. For instance, the sequence indicator field for a particular record may be one to indicate that the corresponding replacement advertisement was the first of one or more advertisements communicated during a programming break. The sequence indicator field for a different record may be two to indicate that the corresponding replacement advertisement was the second of two or more advertisements communicated during a programming break. Etc.

In an example, the user profile information is associated with the content presentation device 104, and the user profile information specifies the age, sex, list of hobbies, etc., associated with a user of the content presentation device 104. In operation, each replacement advertisement record 600 relates user profile information associated with a plurality of different users and presentation times associated with the different users.

An example of the database is stored and maintained in the content management system 108. In this regard, in an example, the user profile information associated with the content presentation device 104 is stored in a database (e.g., in a different database or a table of the same database). In an example, the content presentation device 104 communicates the presentation time determined above to the content management system 108. As noted above, in another example, the content management system 108 determines the presentation time and updates the database accordingly.

At block 515, if the presentation time exceeds a threshold amount, then at block 520, an indication that advertisement presentation costs should be assessed is communicated. As noted above, in some instances, replacement advertisements are associated with a so-called "pay point," at which point costs for the presentation of the replacement advertisements are assessed. Different replacement advertisements may have different pay points, and the pay points may be specified differently (e.g., absolute terms such as 5 seconds, a percentage of presentation such as 15%, etc.) When the pay point is reached, an indication is communicated to, for example, a server serving the replacement advertisement, such as the supplemental content delivery system 112. That server may, in turn, tally the number of times the replacement advertisement has reached the pay point and may communicate that information to a billing system to facilitate deducting fees associated with the presentation of the replacement advertisement.

Figure 7:
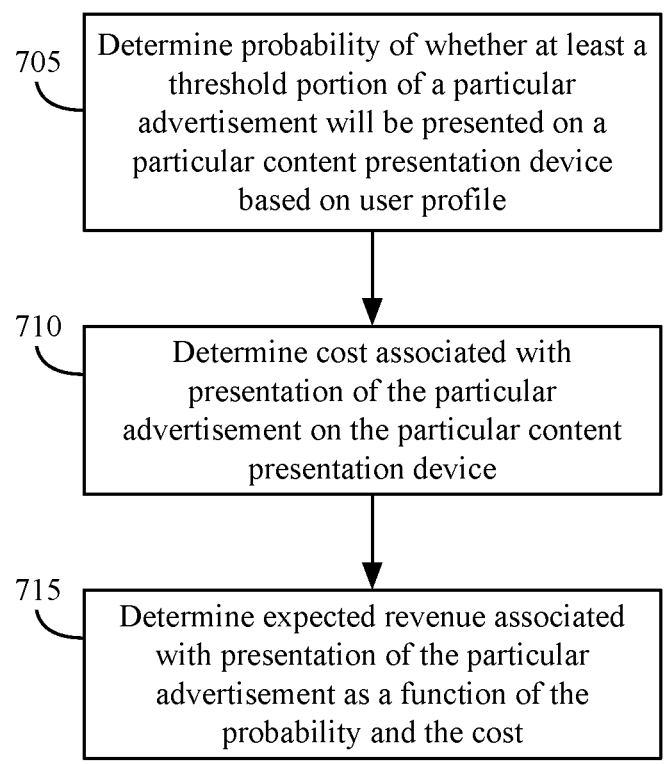
FIG. 7 illustrates operations that facilitate determining an expected revenue associated with the presentation of a particular replacement advertisement to a particular user, in accordance with an example.

FIG. 7 illustrates examples of operations that facilitate determining an expected revenue associated with the presentation of a particular replacement advertisement to a particular user. At block 600, the probability of whether at least a threshold portion of a particular advertisement will be presented on a particular content presentation device 104 is determined based on a user profile. In an example, the content management system 108 performs this determination, and the determination is performed proximate a time for selecting a replacement advertisement to serve to a content presentation device 104 (e.g., proximate time-period T36).

In an example, determining the probability involves comparing the user profile information associated with the content presentation device 104 requesting the replacement advertisement with user profile information associated with the replacement advertisement specified in the database described above, or with user profile information associated with replacement advertisements specified in the database having a similar type as the replacement advertisement (e.g., a similar genre). For instance, in an example, the UPIPT field of the record associated with the replacement advertisement is searched for a UPTIPT pair that most closely matches the user profile information. User profiles with similar age ranges (e.g., within five years), sex, lists of hobbies, etc., are considered to match. The presentation time(s) associated with matching user profiles is considered to be associated with the user profile information associated with the content presentation device 104 requesting the replacement advertisement.

As noted previously, examples of replacement advertisement records specify advertisement sequence indicator fields that indicate the relative position within a sequence of advertisements presented during a programming break that a particular replacement advertisement was presented. In some examples, the matching performed above takes this information into consideration. For instance, in an example, records that specify a sequence indicator of one are selected and searched as indicated above when the replacement advertisement is to be the first advertisement of a sequence of one or more advertisements to be presented during a programming break. Records that specify a sequence indicator of two are selected and searched as indicated above when the replacement advertisement is to be the second advertisement of a sequence of two or more advertisements to be presented during the programming break. Etc.

After determining the presentation time(s) associated with the user profile information associated with the content presentation device 104, the probability of whether the corresponding user will watch the corresponding replacement advertisement is determined. For instance, in an example where ten presentation times are determined to be associated with the user profile information, and five of those exceed the pay point associated with the replacement advertisement, the probability is determined to be 50%. If all ten exceed the pay point, the probability is determined to be 100%, etc. If none exceed the pay point, the probability is determined to be 0%. Etc.

At block 710, the cost associated with the presentation of the replacement advertisement to the content presentation device 104 is determined. In an example, the cost is based on factors such as the file size of the replacement advertisement and server costs (e.g., content delivery network (CDN) costs) associated with the server hosting the replacement advertisement. CDN costs can vary based on geographic region. For example, CDN costs for transferring data via Intranet networks from the eastern United States to a central location in the United States may be different from the CND costs for transferring data from the western United States. Similarly, different parts of Europe might have different CDN costs.

At block 715, the expected revenue associated with the presentation of the replacement advertisement is determined as a function of the probability, the cost determined above, and the amount an advertiser is willing to pay for the presentation of the replacement advertisement. An example of the expected revenue is determined according to the following:

$$\text{Expected Revenue} = (\text{Placement Probability} \times \text{Advertiser Spend}) - \text{Placement Cost}$$

For instance, if the probability of presentation passed the pay point is 50%, the cost for delivery is $2, and the amount an advertiser is willing to pay for placement of the replacement advertisement is $10, the expected revenue is determined to be $3. In this case, the expected revenue may be sufficient to warrant communication of the replacement advertisement to a content presentation device 104.

On the other hand, if the probability of presentation passed the pay point is 15%, then the expected revenue would be −$0.50. That is, the presentation of the replacement advertisement may result in a loss, in which case communication of the replacement advertisement to a content presentation device 104 may not be warranted.

Figure 8:
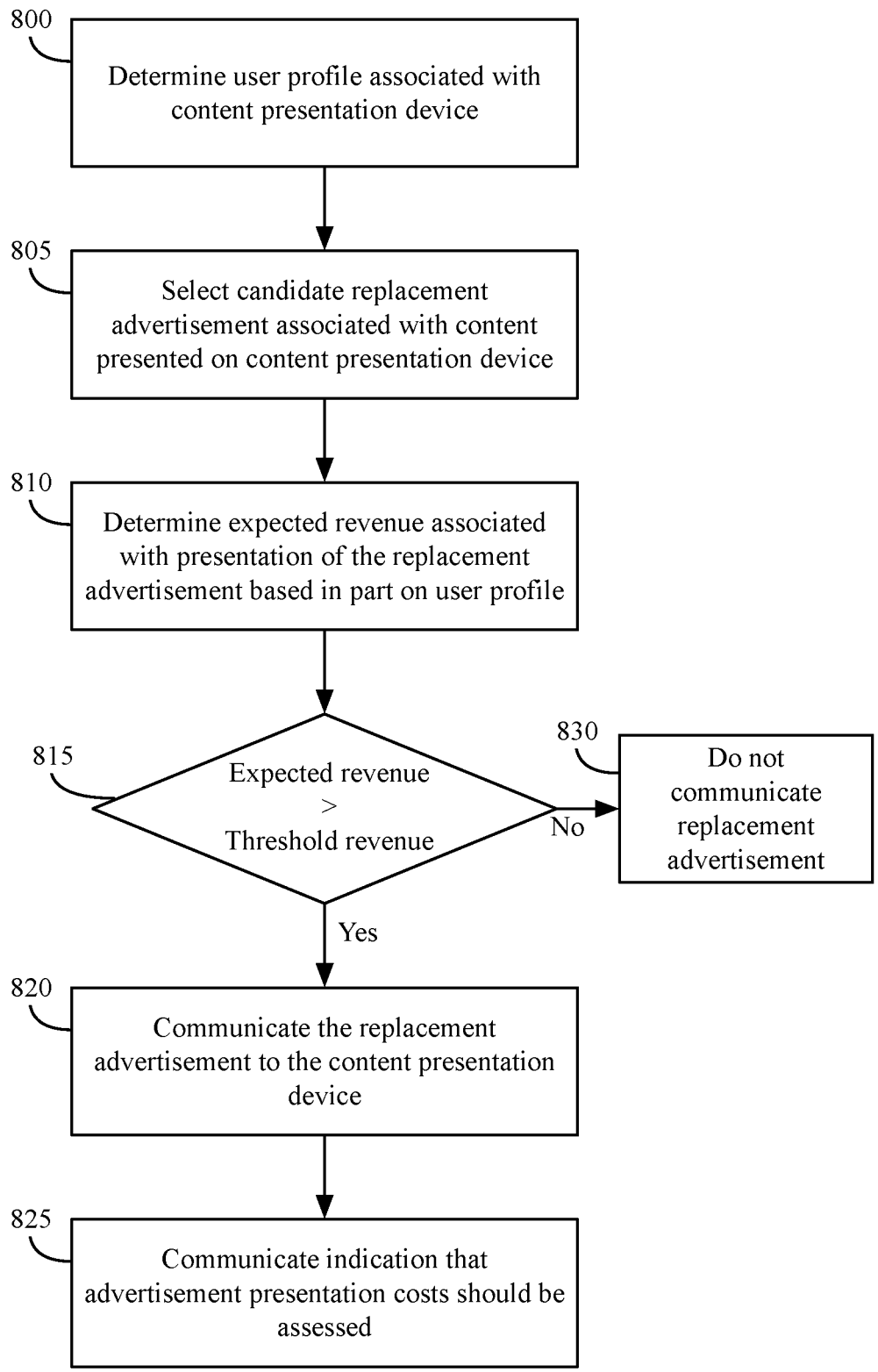
FIG. 8 illustrates operations that facilitate determining whether to communicate a particular replacement advertisement to a particular content presentation device, in accordance with an example.

FIG. 8 illustrates examples of operations that facilitate determining whether to communicate a particular replacement advertisement to a particular content presentation device. At block 800, the user profile associated with content presentation device 104 is determined. For instance, in an example, at time-period T36, the content presentation device 104 communicates a request for a replacement advertisement to the content management system 108. An example of the request includes information that facilitates determining, by the content management system 108, user profile information associated with the request. An example of the user profile information specifies the age, sex, list of hobbies, etc., associated with a user of the content presentation device 104.

At block 805, a candidate replacement advertisement associated with content presented on the content presentation device 104 is selected. For instance, an example of the content management system 108 searches for a replacement advertisement related to content being presented by the content presentation devices and/or related to user profile information associated with the user of the content presentation device 104. An example of the replacement advertisement has a length that facilitates insertion of the replacement advertisement within the modifiable portion of the content being presented on the content presentation device 104.

At block 810, the expected revenue associated with the presentation of the replacement advertisement is determined based in part on the user profile. In an example, the operations in FIG. 7 are performed to determine the expected revenue.

At block 815, if the expected revenue is greater than a threshold amount of revenue, then at block 820, the replacement advertisement is communicated to the content presentation device 104. In an example, the threshold amount corresponds to zero and means that if there is any expected revenue, then the replacement advertisement is to be communicated. In other examples, the threshold amount is set to a higher amount. Requiring a threshold amount greater than zero can be used to compensate for unexpected costs associated with replacing an advertisement that are not easy to factor into the determination of the expected revenue.

At block 825, an indication that advertisement presentation costs should be assessed is communicated. As noted above, in some instances, replacement advertisements are associated with a so-called "pay point," at which point costs for the presentation of the replacement advertisements are assessed. Different replacement advertisements may have different pay points, and the pay points may be specified differently (e.g., absolute terms such as 5 seconds, a percentage of presentation such as 15%, etc.) When the pay point is reached, an indication is communicated to, for example, a server serving the replacement advertisement, such as the supplemental content delivery system 112. That server may, in turn, tally the number of times the replacement advertisement has reached the pay point and may communicate that information to a billing system to facilitate deducting fees associated with the presentation of the replacement advertisement.

If at block 815, the expected revenue is not greater than the threshold amount of revenue, then the operations cease at block 830 until the next opportunity to insert a replacement advertisement.

Figure 9:
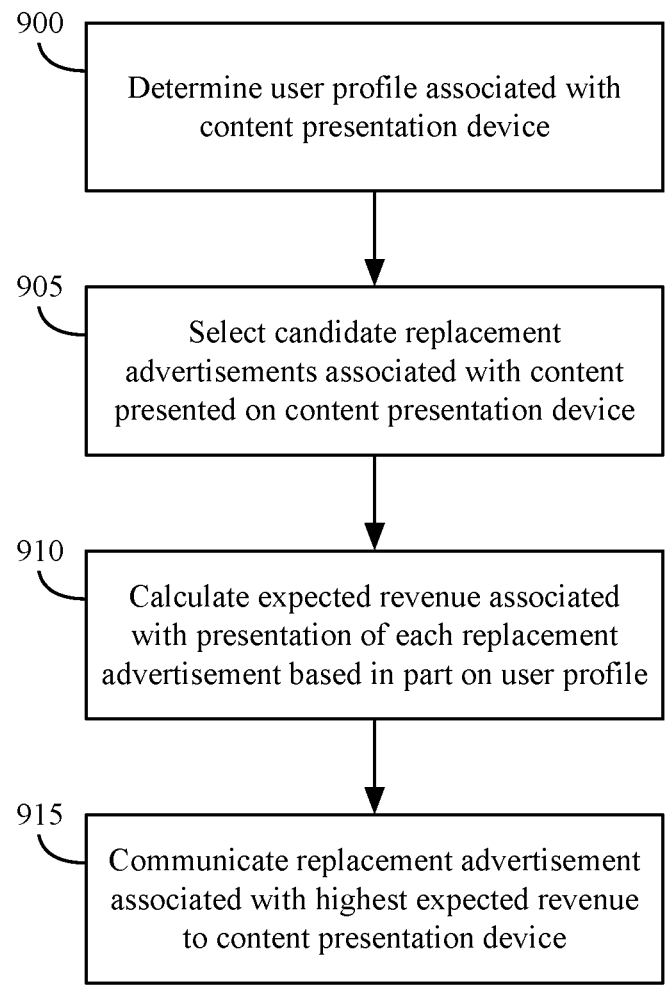
FIG. 9 illustrates operations that facilitate selecting a particular replacement advertisement among a plurality of replacement advertisements to communicate to a content presentation device, in accordance with an example.

FIG. 9 illustrates examples of operations that facilitate selecting a particular replacement advertisement among a plurality of replacement advertisements to communicate to a content presentation device. At block 900, the user profile associated with content presentation device 104 is determined. For instance, in an example, at time-period T36, the content presentation device 104 communicates a request for a replacement advertisement to the content management system 108. An example of the request includes information that facilitates determining, by the content management system 108, user profile information associated with the request. An example of the user profile information specifies the age, sex, list of hobbies, etc., associated with a user of the content presentation device 104.

At block 905, candidate replacement advertisements associated with content presented on content presentation device 104 are selected. For instance, an example of the content management system 108 searches for replacement advertisements related to content being presented by the content presentation device 104 and/or related to user profile information associated with the user of the content presentation device 104. Examples of the replacement advertisements have a length that facilitates insertion of the replacement advertisements within the modifiable portion of the content being presented on the content presentation device 104.

At block 910, the expected revenue associated with the presentation of each of the replacement advertisements is determined based in part on the user profile. In an example, the operations in FIG. 7 are performed to determine the expected revenue.

At block 915, the replacement advertisement associated with the highest expected revenue is communicated to the content presentation device 104.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well, and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:
1. A computer implemented method comprising:
receiving, by at least one computer processor, digital fingerprint information corresponding to geometric regions of frames of a video content that facilitate identifying the video content being presented on a multimedia channel;
identifying advertisements being communicated to one or more content presentation devices based on associating an advertisement of the advertisements to the video content presented on the multimedia channel via the digital fingerprint information;
determining, based on the digital fingerprint information, amounts of time identified advertisements are being presented on the multimedia channel based on determining a point at which a channel change occurs;
storing, in a database, records that associate the identified advertisements with user profile information associated with users of the one or more content presentation devices, and the amounts of time the identified advertisements are being presented;
receiving, from a content presentation device of the one or more content presentation devices associated with particular user profile information, a request for the advertisement over the multimedia channel;
for one or more advertisements of the identified advertisements, determining:

29 based on the particular user profile information, a probability of whether at least a threshold portion of each of the one or more advertisements will be presented on the content presentation device based on comparing the user profile information to further user profile information of a user profile information/presentation time (UPIPT) field of the one or more advertisements to determine whether the user profile information and the further user profile information match based on demographic information similarities between the user profile information and the further user profile information, and a cost associated with presentation of each of the one or more advertisements on the content presentation device, wherein the cost varies based on a type of the one or more advertisements presented, and calculating an expected revenue associated with presentation of each of the one or more advertisements based on the probability and the cost;

when the expected revenue exceeds a threshold revenue, setting the advertisement to be one of the one or more advertisements; and communicating the advertisement to the content presentation device over the multimedia channel.

2. The computer implemented method of claim 1, wherein the advertisement corresponds to a replacement advertisement, and wherein the replacement advertisement is to replace a pending advertisement communicated in a transmission sequence from a content distribution system.

3. The computer implemented method of claim 2, further comprising determining a position within a sequence to insert the replacement advertisement based on an advertisement sequence indicator value of the replacement advertisement.

4. The computer implemented method of claim 1, wherein the expected revenue is calculated based on:

$$ER=(PP \times AS)-PC$$

wherein,
ER is the expected revenue,
PP is a placement probability indicating the probability of whether the threshold portion of each of the one or more advertisements will be presented on the content presentation device,
AS is an advertiser spend indicating an amount the advertiser is willing to pay for placement of each of the one or more advertisements, and
PC is a placement cost indicating the cost associated with presentation of each of the one or more advertisements on the content presentation device.

5. The computer implemented method of claim 1, wherein the cost is determined based on a file size of each of the one or more advertisements, a geographic location of the content presentation device, and a cost for hosting each of the one or more advertisements.

6. The computer implemented method of claim 1, further comprising:

based on calculating the expected revenue associated with presentation of each of the one or more advertisements, determining which of each of the one or more advertisements has a highest expected revenue; and
setting the advertisement to be the one or more advertisements with the highest expected revenue.

7. The computer implemented method of claim 1, further comprising updating the database to indicate the one of the one or more advertisements was transmitted to the content presentation device.

30

8. A non-transitory computer-readable medium having instructions stored thereon that when executed by at least one processor, cause the at least one processor to perform operations comprising:

receiving digital fingerprint information corresponding to geometric regions of frames of a video content that facilitate identifying the video content being presented on a multimedia channel;

identifying advertisements being communicated to one or more content presentation devices based on associating an advertisement of the advertisements to the video content presented on the multimedia channel via the digital fingerprint information;

determining, based on the digital fingerprint information, amounts of time identified advertisements are being presented on the multimedia channel based on determining a point at which a channel change occurs;

storing, in a database, records that associate the identified advertisements with user profile information associated with users of the one or more content presentation devices, and the amounts of time the identified advertisements are being presented;

receiving, from a content presentation device of the one or more content presentation devices associated with particular user profile information, a request for the advertisement over the multimedia channel;

for one or more advertisements of the identified advertisements, determining:

based on the particular user profile information, a probability of whether at least a threshold portion of each of the one or more advertisements will be presented on the content presentation device based on comparing the user profile information to further user profile information of a user profile information/presentation time (UPIPT) field of the one or more advertisements to determine whether the user profile information and the further user profile information match based on demographic information similarities between the user profile information and the further user profile information, and a cost associated with presentation of each of the one or more advertisements on the content presentation device, wherein the cost varies based on a type of the one or more advertisements presented, and calculating an expected revenue associated with presentation of each of the one or more advertisements based on the probability and the cost;

when the expected revenue exceeds a threshold revenue, setting the advertisement to be one of the one or more advertisements; and communicating the advertisement to the content presentation device over the multimedia channel.

9. The non-transitory computer-readable medium of claim 8, wherein the advertisement corresponds to a replacement advertisement, and wherein the replacement advertisement is to replace a pending advertisement communicated in a transmission sequence from a content distribution system.

10. The non-transitory computer-readable medium of claim 9, wherein the operations further comprise determining a position within a sequence to insert the replacement advertisement based on an advertisement sequence indicator value of the replacement advertisement.

11. The non-transitory computer-readable medium of claim 8, wherein the expected revenue is calculated based on:

$$ER=(PP \times AS)-PC$$

wherein,
ER is the expected revenue,
PP is a placement probability indicating the probability of whether the threshold portion of each of the one or more advertisements will be presented on the content presentation device,
AS is an advertiser spend indicating an amount the advertiser is willing to pay for placement of each of the one or more advertisements, and
PC is a placement cost indicating the cost associated with presentation of each of the one or more advertisements on the content presentation device.

12. The non-transitory computer-readable medium of claim 8, wherein the cost is determined based on a file size of each of the one or more advertisements, a geographic location of the content presentation device, and a cost for hosting each of the one or more advertisements.

13. The non-transitory computer-readable medium of claim 8, wherein the operations further comprise:
based on calculating the expected revenue associated with presentation of each of the one or more advertisements, determining which of each of the one or more advertisements has a highest expected revenue; and
setting the advertisement to be the one or more advertisements with the highest expected revenue.

14. The non-transitory computer-readable medium of claim 8, wherein the operations further comprise updating the database to indicate the one of the one or more advertisements was transmitted to the content presentation device.

15. A computing system comprising:
a memory storing instructions;
at least one processor, coupled to the memory, configured to process the stored instructions to:
receive digital fingerprint information corresponding to geometric regions of frames of a video content that facilitate identifying the video content being presented on a multimedia channel;
identify advertisements being communicated to one or more content presentation devices based on associating an advertisement of the advertisements to the video content presented by the multimedia channel via the digital fingerprint information;
determine, based on the digital fingerprint information, amounts of time identified advertisements are being presented on the multimedia channel based on determining a point at which a channel change occurs;
store, in a database, records that associate the identified advertisements with user profile information associated with users of the one or more content presentation devices, and the amounts of time the identified advertisements are being presented;
receive, from a content presentation device of the one or more content presentation devices associated with particular user profile information, a request for the advertisement over the multimedia channel;
for one or more advertisements of the identified advertisements, determine:
based on the particular user profile information, a probability of whether at least a threshold portion of each of the one or more advertisements will be presented on the content presentation device based on comparing the user profile information to further user profile information of a user profile information/presentation time (UPIPT) field of the one or more advertisements to determine whether the user profile information and the further user profile information match based on demographic information similarities between the user profile information and the further user profile information, and
a cost associated with presentation of each of the one or more advertisements on the content presentation device, wherein the cost varies based on a type of the one or more advertisements presented, and
calculate an expected revenue associated with presentation of each of the one or more advertisements based on the probability and the cost;
when the expected revenue exceeds a threshold revenue, set the advertisement to be one of the one or more advertisements; and
communicate the advertisement to the content presentation device over the multimedia channel.

16. The computing system of claim 15, wherein the advertisement corresponds to a replacement advertisement, and wherein the replacement advertisement is to replace a pending advertisement communicated in a transmission sequence from a content distribution system.

17. The computing system of claim 16, wherein the at least one processor is further configured to determine a position within a sequence to insert the replacement advertisement based on an advertisement sequence indicator value of the replacement advertisement.

18. The computing system of claim 15, wherein the expected revenue is calculated based on:

$$ER=(PP \times AS)-PC$$

wherein,
ER is the expected revenue,
PP is a placement probability indicating the probability of whether the threshold portion of each of the one or more advertisements will be presented on the content presentation device,
AS is an advertiser spend indicating an amount the advertiser is willing to pay for placement of each of the one or more advertisements, and
PC is a placement cost indicating the cost associated with presentation of each of the one or more advertisements on the content presentation device.

19. The computing system of claim 15, wherein the cost is determined based on a file size of each of the one or more advertisements, a geographic location of the content presentation device, and a cost for hosting each of the one or more advertisements.

20. The computing system of claim 15, wherein the at least one processor is further configured to:
based on calculating the expected revenue associated with presentation of each of the one or more advertisements, determine which of each of the one or more advertisements has a highest expected revenue; and
set the advertisement to be the one or more advertisements with the highest expected revenue.

\* \* \* \* \*